(12) United States Patent
Frank et al.

(10) Patent No.: US 10,851,815 B2
(45) Date of Patent: Dec. 1, 2020

(54) HYDRAULIC CIRCUIT FOR OPERATING AN AIRCRAFT LANDING GEAR

(71) Applicant: SAFRAN LANDING SYSTEMS, Velizy Villacoublay (FR)

(72) Inventors: David Frank, Moissy-Cramayel (FR); Jean-Luc Belleval, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/691,065

(22) Filed: Nov. 21, 2019

(65) Prior Publication Data
US 2020/0164970 A1    May 28, 2020

(30) Foreign Application Priority Data
Nov. 23, 2018  (FR) ...................................... 18 71798

(51) Int. Cl.
*F15B 20/00*  (2006.01)
*F15B 13/06*  (2006.01)

(52) U.S. Cl.
CPC ............ *F15B 20/004* (2013.01); *F15B 13/06* (2013.01); *F15B 2211/30595* (2013.01)

(58) Field of Classification Search
CPC .......... F15B 13/02; F15B 13/04; F15B 13/06; F15B 20/004; F15B 2211/30595; F15B 2211/30565; B64C 25/22; B64C 25/26
See application file for complete search history.

(56) References Cited

U.S. PATENT DOCUMENTS

| | | | |
|---|---|---|---|
| 8,028,954 B2 * | 10/2011 | Leutard ................. | F15B 20/004 244/102 R |
| 8,136,760 B2 * | 3/2012 | Leutard ................. | F15B 20/004 244/102 R |

(Continued)

FOREIGN PATENT DOCUMENTS

| | | |
|---|---|---|
| EP | 1 914 164 A1 | 4/2008 |
| EP | 2 070 818 A1 | 6/2009 |
| GB | 2469484 A | 10/2010 |

OTHER PUBLICATIONS

French Search Report for 1871798 dated Jun. 3, 2019.

*Primary Examiner* — Michael Leslie
(74) *Attorney, Agent, or Firm* — Sughrue Mion, PLLC

(57) ABSTRACT

The invention relates to a hydraulic circuit for operating an aircraft landing gear comprising:
a general valve (1) for admitting a supply pressure into the circuit;
distributors (4, 6) for supplying undercarriages and/or landing gear doors operating actuators (3) or release actuators for hooks (5) maintaining the undercarriages and/or the doors in the retracted position;
a depressurization valve (102) for, in an open position, allowing the selective distribution of supply pressure to an extension chamber (3A) or a retraction chamber (3B) of each operating actuator by the distributors, and, in a depressurization position, forcing the return of a retraction chamber of each operating cylinder.
According to the invention, the depressurization valve is returned (105) in a stable manner to the depressurization position, and is moved into the open position only in response to the presence of supply pressure downstream of the general valve.

4 Claims, 3 Drawing Sheets

(56) References Cited

U.S. PATENT DOCUMENTS

| | | | | |
|---|---|---|---|---|
| 8,393,565 | B2* | 3/2013 | Frank | B64C 25/22 |
| | | | | 244/50 |
| 8,418,958 | B2* | 4/2013 | Evans | B64C 25/30 |
| | | | | 91/444 |
| 8,807,480 | B2* | 8/2014 | Frank | B64C 25/26 |
| | | | | 244/104 FP |
| 9,422,052 | B2* | 8/2016 | Kondo | F15B 20/004 |
| 10,106,248 | B2* | 10/2018 | Boucher | B64C 25/22 |
| 2008/0087766 | A1 | 4/2008 | Leutard et al. | |
| 2009/0050736 | A1* | 2/2009 | Bennett | B64C 25/58 |
| | | | | 244/102 R |
| 2009/0152394 | A1 | 6/2009 | Frank et al. | |
| 2020/0148339 | A1* | 5/2020 | Liegeois | B64C 25/22 |

\* cited by examiner

[Fig. 1]
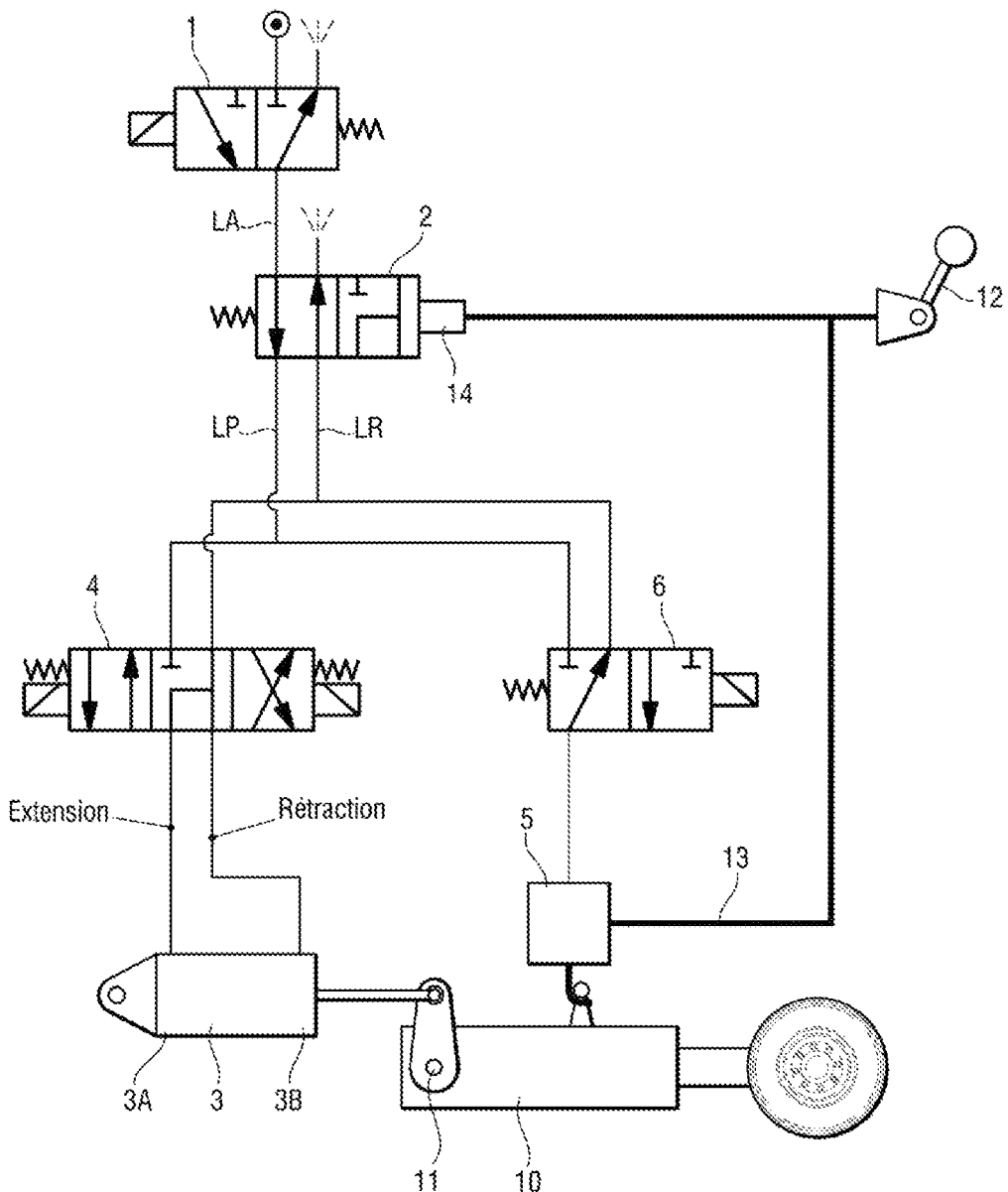

[Fig. 2]
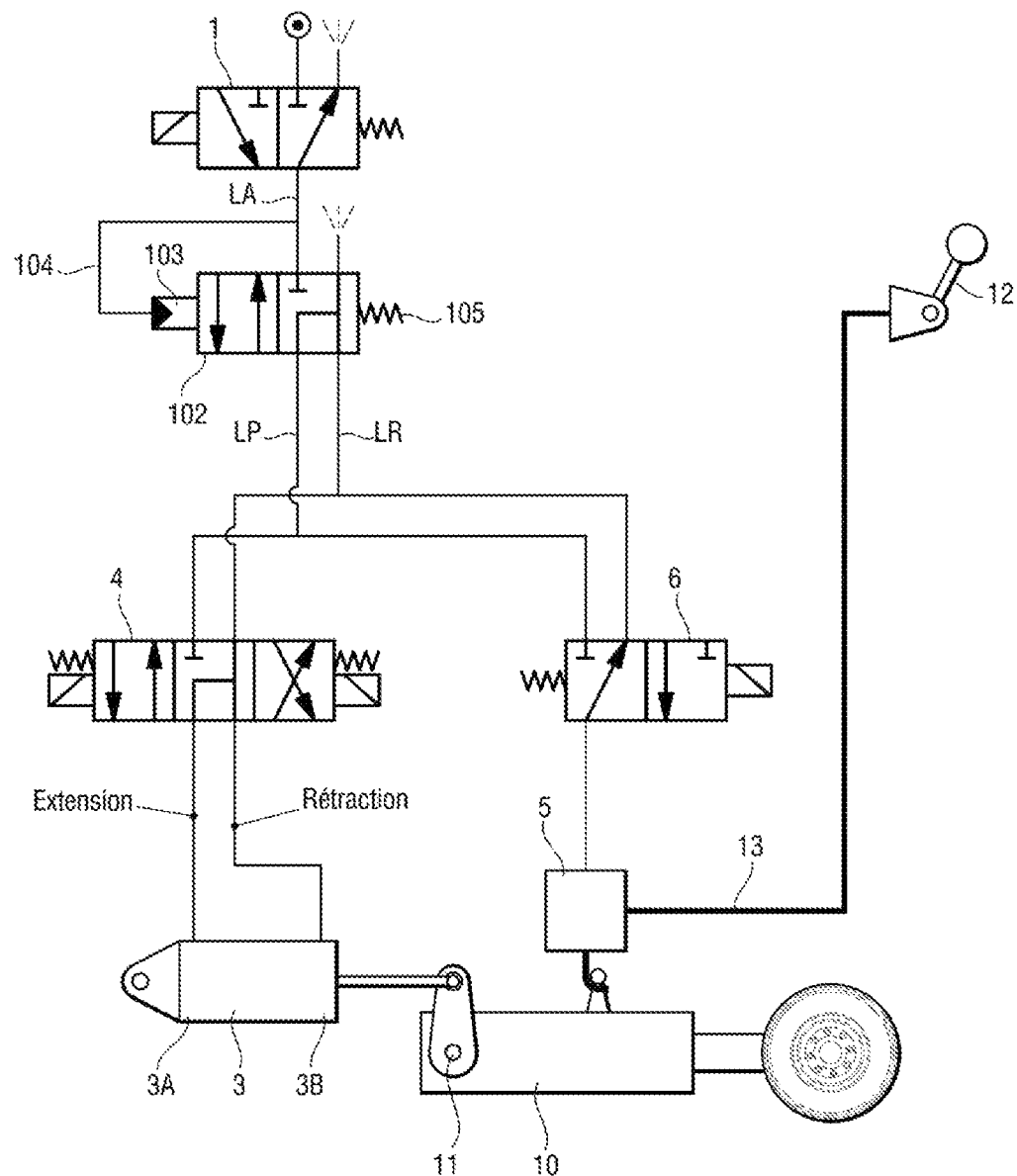

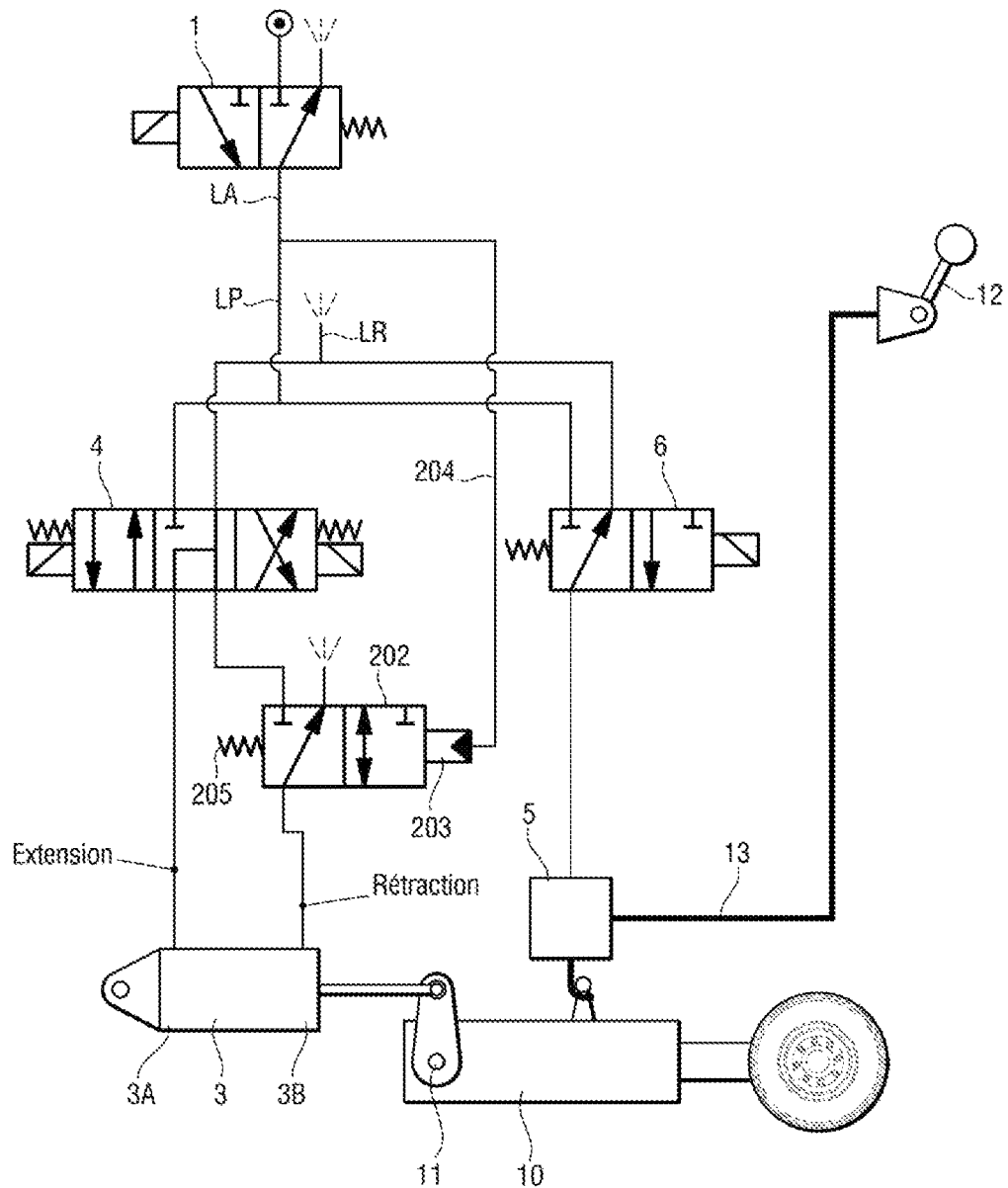
[Fig. 3]

HYDRAULIC CIRCUIT FOR OPERATING AN AIRCRAFT LANDING GEAR

BACKGROUND OF THE INVENTION

Aircrafts equipped with retractable landing gears that can be moved between a retracted position and an extended position using various operating actuators are known. The landing gear is stabilized in the retracted position by means of hydraulically operated latching boxes. The same applies to the doors that close the cargo bays in which the landing gear is retracted.

With reference to FIG. 1 illustrating a simplified diagram of an aircraft landing gear hydraulic circuit according to the prior art, the hydraulic circuit first comprises a general valve 1 comprising a supply position in which a supply line LA of the circuit is pressurized to supply pressure, and a return position in which the supply line LA returns. The return position is a stable rest position here, and the supply position is selected using an electric control.

The circuit consists of two main lines, including a pressure line LP to supply pressure to the distributors supplying the hydraulic components of the circuit, and a return line LR connected to the aircraft return.

The circuit includes a depressurization valve 2 located here downstream of the general valve 1 and which, in an open position, connects the pressure line LP to the supply line LA and the return line LR to return, and, in a depressurization position, connects the pressure line LP and the return line LR to return. Here the open position is a stable rest position.

Downstream of the depressurization valve 2, the pressure LP and return LR lines lead here to a first 4-way, three-position distributor connected to an operating cylinder 3 adapted to rotate an undercarriage 10 about an axis 11, between a retracted position shown here and an extended position. To do this, the valve 4 selectively connects an extension line leading here to a plenum chamber 3A of the actuating cylinder 3 and a retraction line leading to an annular chamber 3B of the operating cylinder 3 with the pressure LP and return LR lines.

The pressure LP and return LR lines also lead to a second two-position distributor 6 connected to a latching box 5 single-acting release actuator (the actuator is integrated into the latching box here). The hook of the latching box 5 is adapted to close automatically on a finger of the undercarriage 10 when it reaches the retracted position to maintain it in that position. It is therefore necessary to release the hook to allow the undercarriage 10 to move to the extended position.

Of course, if the cargo bay which the landing gear retracts in is equipped with one or more doors, the hydraulic circuit will also include a valve to supply a door actuating cylinder, and a distributor to release a hook maintaining the doors in the closed position. The pressure LP and return LR lines then terminate at said distributors as they terminate at the distributors 4 and 6. All this equipment is of course replicated for each of the undercarriages of the landing gears, although they are not represented here.

In the event of hydraulic failure, including loss of pressure, it must be possible to ensure that the undercarriages can be lowered to the extended position. In this respect, the hooks of the latching boxes must be released to release the doors and the undercarriages, and no volume of fluid must be blocked in the chambers of the actuators concerned, preventing the movement of the undercarriages and the doors. In particular, at the very least, the retraction chamber of the operating cylinder(s) (in this case the chamber 3B) should be positioned to return. For this purpose, it is known to use a mechanical emergency control in the form of a lever 12 operated by the aircraft pilot, which on the one hand forces the release of the hooks of the latching boxes 5 using a cable connection 13, and on the other hand forces the depressurization valve 2 to move into the depressurization position, which allows any fluid contained in the actuating cylinder 3 to flow if necessary to the aircraft sump, and in particular the fluid contained in the retraction chamber 3B, without any significant resistance, when the undercarriage is lowered to the extended position, regardless of the position of the distributor 4.

It was also proposed to replace this mechanical emergency control with a motorized emergency control, by equipping the latching boxes with motors that could release the hooks, and by equipping the depressurization valve with a motor that could move it against the return spring to the depressurization position.

However, these two options remain cumbersome and require special maintenance. For example, the cable control cables require regular tension checks. In addition, emergency controls must be regularly tested to ensure that they are working properly. At each test, the maintenance teams must then reset the circuit by repositioning the hooks and the depressurization valve in their nominal operating condition.

PURPOSE OF THE INVENTION

The invention aims to provide a simplified hydraulic circuit to allow the landing gear(s) to be extended in the event of a loss of pressure.

SUMMARY OF THE INVENTION

To reach this goal, a hydraulic circuit for operating an aircraft landing gear is proposed, which comprises:
  a general valve to admit a supply pressure in the circuit;
  distributors for supplying undercarriages and/or landing gear doors operating actuators or release actuators for hooks maintaining the undercarriages and/or the doors in the retracted position;
  a depressurization valve for, in an open position, allowing the selective distribution of supply pressure to an extension chamber or a retraction chamber of each actuator by the distributors, and, in a depressurization position, forcing the return of a retraction chamber of each actuator;

According to the invention, the depressurization valve is returned in a stable manner to the depressurization position, and is moved into the open position only in response to the presence of supply pressure downstream of the general valve.

Thus, the depressurization valve is by default in the depressurization state. It can only be moved to the open position if the general valve has admitted supply pressure into the circuit. Therefore, the general valve must be in the supply position and supply pressure must be present upstream of the general valve for the depressurization valve to be in the open position. If the general valve fails, or the aircraft pumps are no longer driven, then the depressurization valve automatically moves into the depressurization position without any action by the pilot, which greatly simplifies the hydraulic circuit by eliminating any mechanical or motorized control of the depressurization valve. In addition, the depressurization valve is activated each time the undercarriages are operated, so that their operation can easily be monitored.

BRIEF DESCRIPTION OF THE DRAWINGS

The invention will be better understood in the light of the following description, made in reference to the figures of the attached drawings, in which:

FIG. 1 the already detailed FIG. 1 showing the prior art:

FIG. 2 is a schematic view of a hydraulic circuit for operating an aircraft landing gear according to a first particular embodiment of the invention;

FIG. 3 is a schematic view of a hydraulic circuit for operating an aircraft landing gear according to a second particular embodiment of the invention;

DETAILED DESCRIPTION OF THE INVENTION

According to a first particular embodiment of the detailed invention with reference to FIG. 2, the circuit illustrated here is very similar to that in FIG. 1, and the common elements have common references. The reader should refer to their description in the introductory part hereof. The main difference with the circuit of the prior art is in the depressurization valve 102, whose stable position imposed by the return spring 105 is now the depressurization position. The open position is controlled here by means of a hydraulic control 103 which is only able to overcome the force of the return spring 105 if supply pressure has been admitted into the supply line LA, i. e. if the general valve 1 has been controlled to the supply position AND if supply pressure has been supplied to the circuit by the aircraft pumps or an accumulator. For this purpose, a bypass 104 is provided from a branch of the supply line LA to supply the hydraulic control 103. It should be noted that the depressurization valve 102 is no longer mechanically operated by the lever 12. The depressurization valve 102 operates fully automatically, with the hydraulic circuit being depressurized by default except in the specific phases of undercarriages operation.

In the depressurization position, the depressurization valve 102 which allows any fluid contained in the operating cylinder 3 to flow if necessary to the aircraft sump, and in particular the fluid contained in the retraction chamber 3B, without any significant resistance, when the undercarriage is lowered to the extended position, regardless of the position of the distributor 4.

According to a second particular embodiment of the invention detailed with reference to FIG. 3, the depressurization valve 202 is now arranged on a line of the circuit from the distributor 6 to the retraction chamber 3B of the actuating cylinder 3. As in the previous embodiment, the stable position of the depressurization valve 202 is now the depressurization position. The open position is controlled here by means of a hydraulic control 203 which is only able to overcome the force of the return spring 205 if supply pressure has been admitted into the supply line LA, i. e. if the general valve 1 has been controlled to the supply position AND if supply pressure has been supplied to the circuit by the aircraft pumps or an accumulator. For this purpose, a bypass 204 is provided from a branch of the supply line LA to supply the hydraulic control 203. It should be noted that the depressurization valve 202 is no longer mechanically operated by the lever 12. The depressurization valve 102 operates fully automatically, with the hydraulic circuit being depressurized by default except in the specific phases of undercarriages operation.

In the depressurization position, the depressurization valve 202 allows any fluid contained in the retraction chamber 3B to flow if necessary to the aircraft sump without significant resistance when the landing gear is lowered to the extended position, regardless of the position of the distributor 4.

The invention is not limited to what has just been described, but encompasses every alternative solution within the scope of the claims. In particular, if the cargo bay in which the undercarriage retracts is equipped with one or more doors, the hydraulic circuit shall also include a distributor to supply a door actuating cylinder, and a distributor to release a hook maintaining the doors in the closed position. The pressure LP and return LR lines then terminate at said distributors as they terminate at the distributors 4 and 6. All this equipment is of course replicated for each of the undercarriages of the landing gears, although they are not represented here.

The invention claimed is:

1. A hydraulic circuit for operating an aircraft landing gear comprising:
   a general valve (1) for admitting a supply pressure into the circuit;
   distributors (4, 6) for supplying undercarriages and/or landing gear doors operating actuators (3) or release actuators for hooks (5) maintaining the undercarriages and/or the doors in the retracted position;
   a depressurization valve (102; 202) for, in an open position, allowing the selective distribution of supply pressure to an extension chamber (3A) or a retraction chamber (3B) of each actuator by the distributors, and, in a depressurization position, forcing the return of a retraction chamber of each operating actuator;
   characterized in that the depressurization valve is returned (105; 205) in a stable manner to the depressurization position, and is moved into the open position only in response to the presence of supply pressure downstream of the general valve.

2. A hydraulic circuit according to claim 1, wherein a bypass (104; 204) extends from a supply line (LA) extending between the general valve (1) and the valves (4, 6) to supply a pressure control (103; 203) of the depressurization valve placing it in the open position against a return spring (105; 205) to the depressurization position.

3. The hydraulic circuit according to claim 1, wherein the depressurization valve (102) is located between the general valve (1) and the distributors (4,6).

4. The hydraulic circuit according to claim 1, wherein the depressurization valve (202) is placed on a hydraulic line extending between the distributors (4,6) and the retraction chambers of the actuating actuators.

* * * * *